(12) United States Patent
Felix (10) Patent No.: US 11,272,703 B1
(45) Date of Patent: Mar. 15, 2022

(54) PROTECTIVE COVERING FOR A RODENT BAIT STATION

(71) Applicant: Marc Felix, Westhampton, NY (US)

(72) Inventor: Marc Felix, Westhampton, NY (US)

( * ) Notice: Subject to any disclaimer, the term of this patent is extended or adjusted under 35 U.S.C. 154(b) by 124 days.

(21) Appl. No.: 16/825,102

(22) Filed: Mar. 20, 2020

Related U.S. Application Data (60) Provisional application No. 62/821,873, filed on Mar. 21, 2019.

(51) Int. Cl.
*A01M 25/00* (2006.01)
(52) U.S. Cl.
CPC .................. *A01M 25/004* (2013.01)
(58) Field of Classification Search
CPC .... A01M 25/004; A01M 23/02; A01M 23/16; A01M 25/00; A01M 25/002; A01M 1/00; A01M 1/02; A01M 1/026
See application file for complete search history.

(56) References Cited

U.S. PATENT DOCUMENTS 8,196,949 B1 *  6/2012  Hernandez ............. B60R 21/34
                                                   280/507

* cited by examiner

*Primary Examiner* — Joshua J Michener
*Assistant Examiner* — Henry Hooper Mudd
(74) *Attorney, Agent, or Firm* — Betsy Kingsbury Dowd, Esq; BKDowd Law, P.C.

(57) ABSTRACT

A tamper-resistant device for use with a conventional bait station is formed as a reusable, tear-resistant sock for pulling over and protectively covering the station. The sock may be constructed of ballistic nylon with minimal seams strategically placed so as not to directly contact the hinges and edges. The sock forms a tight band encompassing the station to prevent opening via the hinges. An access slit connecting an edge of the opening of the sock to a cut-out for inserting an anchoring stake therethrough allows the device to be installed and removed with the bait station anchored in situ in the ground. A securable flap extending over the opening of the sock may be secured directly to the locked openable side of the station or may include hook-and-loop attachments for securing to complementary attachments on the sock.

20 Claims, 9 Drawing Sheets

PROTECTIVE COVERING FOR A RODENT BAIT STATION

CROSS-REFERENCE TO RELATED APPLICATIONS

This application claims the benefit of and priority to U.S. Provisional Application Ser. No. 62/821,873 entitled PROTECTIVE SOCK FOR A RODENT BAIT STATION filed Mar. 21, 2019, the entirety of which is hereby incorporated herein by reference thereto.

FIELD OF DISCLOSURE

The present disclosure relates generally to rodent bait stations and, in particular, to protective devices or coverings for existing rodent bait stations.

BACKGROUND

A bait station, also referred to as a "bait box," is used to dispense poisonous bait, e.g., rodenticide, to rodents. Some bait stations are constructed to be permanently locked with the bait inside. They are single-use bait stations, which cannot be replenished and reused once the bait has been depleted. Single-use bait stations are disposed of once the poisonous bait locked inside is depleted.

Others are multiple-use bait stations, constructed to be openable and reusable. Such reusable bait stations, commonly formed of plastic, typically include hinges positioned on one side of the bait station which allow the station to be swung open and closed for rebaiting. The hinges may be living hinges or sturdier, e.g., metallic hinges. Bait stations are also typically constructed with some kind of locking mechanism so that children, for example, cannot access the dangerous bait poison.

Although multiple-use bait stations are more economically and environmentally attractive than the single-use type, in that they do not have to be disposed of but can be rebaited and reused, the same features that make these reusable devices openable for rebaiting also render them particularly vulnerable to being compromised by non-targeted animals attempting to access the attractive food source (i.e., rodenticide) inside. For example, the rear of the device including the hinge elements is particularly vulnerable to being pried open by the sharp teeth and claws of a wild animal. In addition, the locking mechanisms on some commercial bait stations, particularly when access is attempted by wild or domestic animals, or by unauthorized persons, are prone to failure, allowing access to the poisonous bait by children or others not knowledgeable about the dangers of the bait.

These vulnerabilities of conventional bait stations have caused concern among health and environmental authorities particularly in regard to the continued use of openable rodent stations on residential properties being treated for rodent infestations. In particular, both children and pets living on or near such properties are at risk of unintentional poisoning in the event of a compromised rodent control station.

There is a need, therefore, for a device that prevents, or at least substantially minimizes the risk of, a bait station being compromised by a non-targeted animal or by a vulnerable child, e.g., and gaining access to the dangerous poisonous bait enclosed therein. There is also a need for a device that renders a bait station tamper-resistant, which is reusable and cost-effective.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a device for covering and protecting a bait station from unwanted access. In particular, the device of the present disclosure prevents, or at least substantially minimizes the risk of, a bait station being compromised by a non-targeted animal or by a vulnerable child, e.g., and gaining access to the dangerous poisonous bait enclosed therein. It also advantageously prevents the targeted rodents as well as non-targeted animals from chewing through the hinges of the bait box, which would undesirably allow the bait stations to be compromised and large amounts of the poisonous bait to be removed.

The present disclosure is also directed to a device for protecting a bait station from unwanted access, which is reusable and cost-effective.

Embodiments of the device are configured for use as an accessory to one or more commercially known rodent bait stations. Preferably, the device can be installed on, or removed from, a commercial bait box in situ without removing the commercial bait box from its anchored location.

The present disclosure is also directed to a device for protecting a bait station from unwanted access, in aspects, a tamper-resistant protective covering device. The bait station includes at least one access port for a target animal to pass therethrough; a hinged side and a securable access side opposite the hinged side to provide authorized access to interior contents of the bait station; and a bottom side for anchoring the bait station onto a surface, in aspects, onto the ground, in use.

The device includes a sock-like body (also referred to herein as a "sock"), the sock-like body including an opening for inserting a bait station therethrough and a closed portion opposite the opening, the sock-like body configured to form a tight-fitting enclosure encompassing the bait station. The sock-like body also includes at least one access opening alignable with the at least one access port in the bait station in use.

The device further includes a securable flap extending from the sock-like body beyond the opening, the securable flap at least partially overhanging the opening. The securable flap secures the device in position over the bait station in use.

In additional aspects, one of the at least one access opening is provided adjacent the securable flap, wherein the securable flap only partially overhangs the opening.

In other aspects, the at least one access opening is two access openings positioned opposite one another, a first one of the two access openings being positioned in the securable flap and a second one of the two access openings being positioned in the closed portion of the sock-like body.

In aspects, the sock-like body of the device is formed of a tear-resistant material.

In some aspects, the material is substantially non-stretchable.

In aspects, the tear-resistant material is a ballistic nylon.

In further aspects, at least one of a left side portion and a right side portion of the sock-like body connecting the closed portion to the opening may be seamlessly connected to one of a top portion and the bottom portion of the sock-like body.

In aspects, the sock-like body includes a bottom portion which is alignable with the bottom side of the bait station in use. The bottom portion preferably includes an access slit and a cut-out for insertion of an anchoring stake therethrough, the access slit extending from the opening edge of the sock-like body to the cut-out. The cut-out and access slit thereby allow a bait station in situ while anchored to the ground to be inserted and securely encompassed within the device.

In aspects, the device may further includes a closing element in the form of a fastening strip, the fastening strip having a first end portion anchored to the bottom portion of the sock-like body adjacent a first side of the access slit, and a second end portion that extends across the access slit and includes a fastening element. The sock-like body includes a complementary fastening element positioned on the bottom portion adjacent a second side of the access slit, the fastening element being removably attachable to the complementary fastening element for holding closed the access slit.

In other aspects, the securable flap is extendable to completely cover the opening, the securable flap being extendable, in aspects, from one of a top portion and a bottom portion of the sock-like body and onto an other one of the top portion and the bottom portion, the securable flap including a fastening element and the other one of the top portion and the bottom portion including a complementary fastening element for removably securing the securable flap over the opening and onto the sock-like body, the device thereby substantially encompassing the bait station on all sides.

In particular aspects, the securable flap is extendable from the top portion over the opening and onto the bottom portion of the sock-like body, wherein the complementary fastening element is positioned on the bottom portion, the complementary fastening element having a first portion adjacent a first side of the access slit and a second portion adjacent a second side of the access slit, wherein a length of the fastening element extends across both the first side and the second side of the access slit, the fastening element covering at least a portion of the access slit and removably attaching the securable flap to the sock-like body via both the first portion and the second portion of the complementary fastening element.

In further aspects, the fastening element and the complementary fastening element may include hook-and-loop elements, preferably, in further aspects, of commercial grade.

In aspects, the securable flap only partially overhangs the opening and includes a through-hole surrounded by a grommet for facilitating securing the securable flap directly to the bait station.

In aspects, the sock-like body and, in aspects, the securable flap, is/are formed of a tear-resistant, durable material, which may, in some aspects, be formed, for example, from high denier thread and/or using a tight weave of suitable materials.

In other aspects, the sock-like body and, in some aspects, the securable flap is/are formed of laminated vinyl, which may be, in aspects, a 13 oz, or in other aspects, an 18 oz laminated vinyl.

The present disclosure is also directed to a device for protecting a bait station from unwanted access, the bait station including at least one access port for a target animal to pass therethrough, a hinged side and a securable access side opposite the hinged side to provide authorized access to interior contents of the bait station, and a bottom side for anchoring the bait station to a surface in use. The device includes a sock-like body formed of a tear-resistant material and a securable flap extending from the sock-like body. The sock-like body includes an opening for inserting the bait station therethrough and a closed portion opposite the opening, the sock-like body preferably being constructed to be substantially form-fitted to the bait station to form a tight-fitting enclosure encompassing the bait station. The sock-like body further includes at least one access opening alignable with the at least one access port of the bait station in use. The securable flap is extendable over the opening and onto one of a top portion and a bottom portion of the sock-like body, the securable flap including a fastening element, and the one of the top portion and the bottom portion including a complementary fastening element for removably securing the securable flap over the opening and onto the sock-like body.

In aspects, a bottom portion of the sock-like body further includes an access slit extending from the opening of the sock-like body to a cut-out configured for insertion of an anchoring stake therethrough.

The present disclosure is also directed to a combination of a bait station and any of the embodiments of the device for protecting a bait station from unwanted access disclosed herein, which includes a sock, preferably a tamper-resistant sock, for fitting over a bait station, preferably in situ, that is, anchored into the ground and loaded with bait for use.

The present disclosure is also directed to a particular combination of: a bait station; and a device for protecting the bait station from unwanted access and installable on the bait station in situ anchored to a surface, e.g., to the ground. The bait station includes at least one access port for a target animal to pass therethrough, a hinged side and a securable access side opposite the hinged side to provide authorized access to interior contents of the bait station, and a bottom side for anchoring the bait station to a surface in use, the bottom side including a punch-out for insertion of an anchoring stake therethrough. The device includes a sock-like body formed of a tear-resistant material, which includes an opening for inserting and encompassing the bait station therein, a closed portion opposite the opening, and at least one access opening aligned with the at least one access port of the bait station. The sock-like body also includes a bottom portion alignable with the bottom side of the bait station in use, the bottom portion including an access slit extending from the opening of the sock-like body to a cut-out for insertion of the anchoring stake therethrough.

In aspects, the device further includes a securable flap extending from the sock-like body, the securable flap extending over the opening and onto the bottom portion of the sock-like body, the securable flap including a fastening element, and the bottom portion including complementary fastening elements for removably securing the securable flap over the opening and onto the bottom portion of the sock-like body.

The sock-like body and, preferably, the securable flap, in aspects of any of the embodiments of the present disclosure, may be formed of a ballistic nylon material.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure of a device for protecting a bait station from unwanted access as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

Figure 1A:
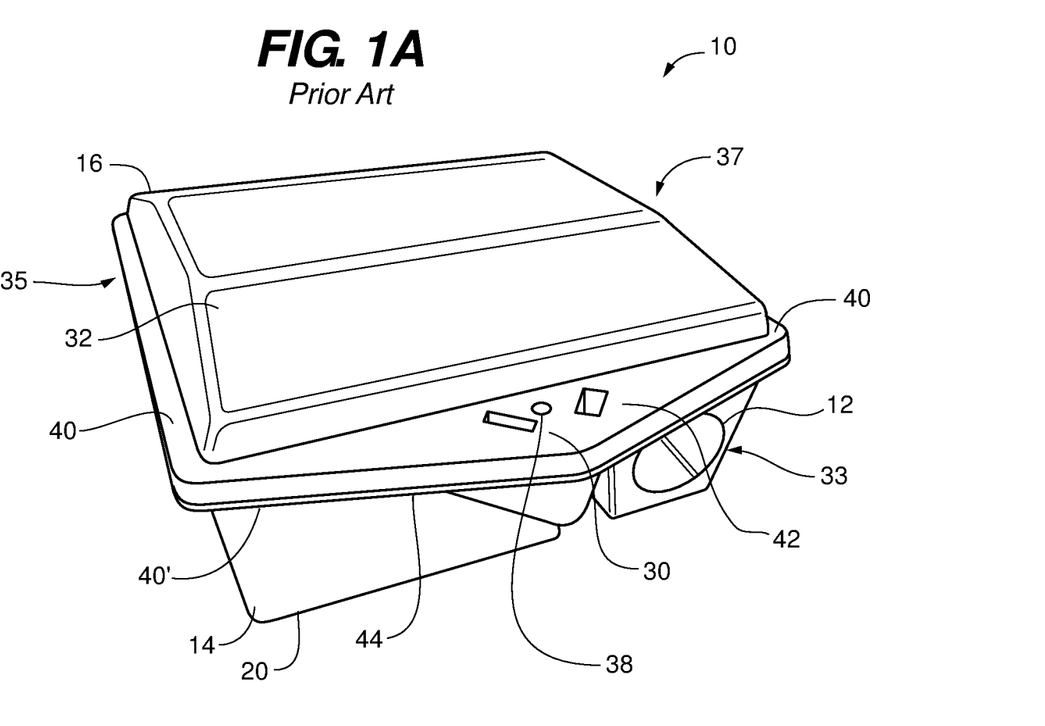
FIG. 1A is a perspective top-front pictorial representation of a prior art rodent bait station.
Figure 1B:
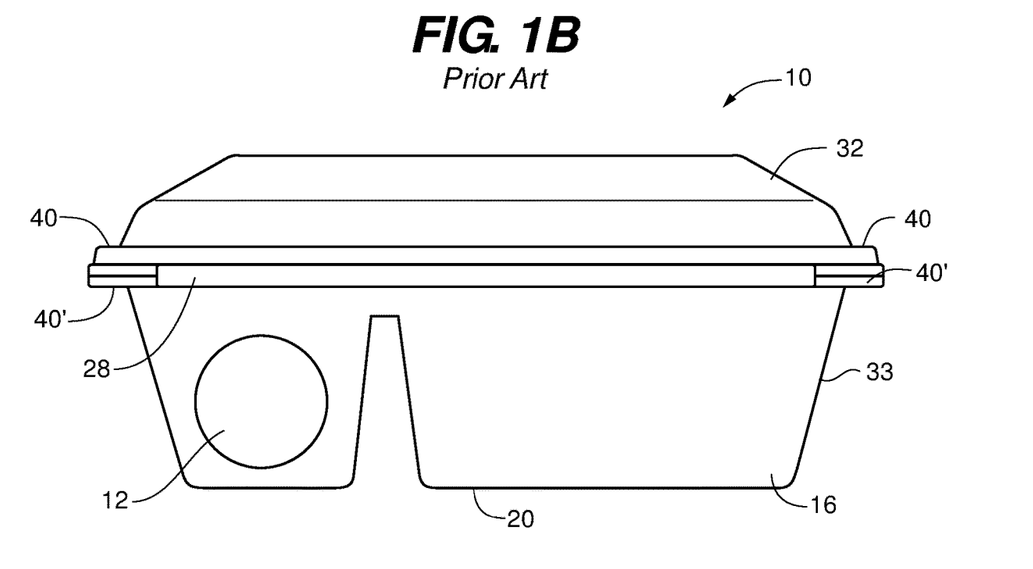
FIG. 1B is a pictorial representation of a rear the prior art rodent bait station of FIG. 1A.
Figure 1C:
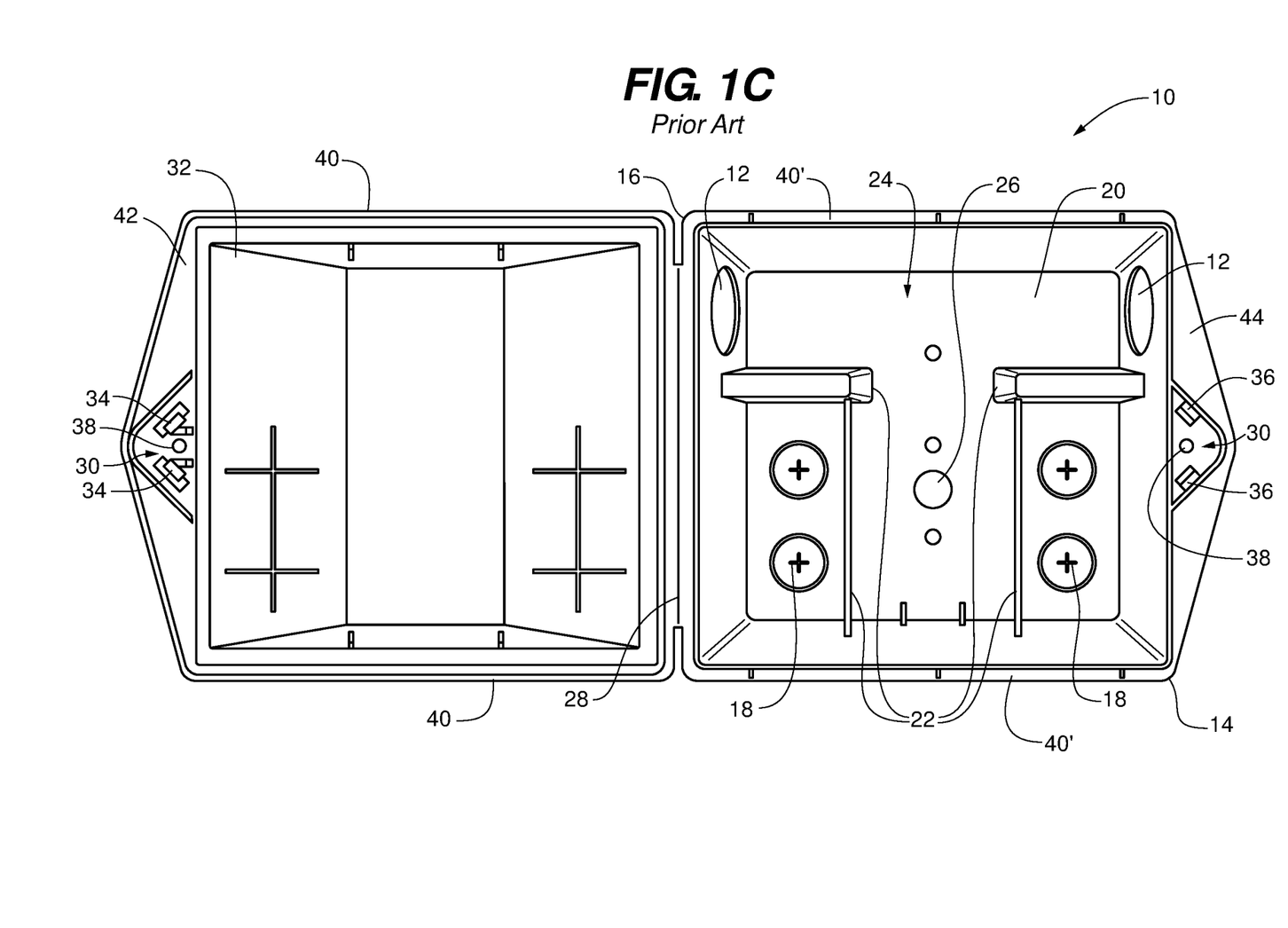
FIG. 1C is a pictorial representation of an interior of the prior art rodent bait station of FIGS. 1A and 1B.

The present disclosure is directed to a device for protecting a bait station from unwanted access. Referring to FIGS. 1A-1C, for example, particular embodiments of the device are configured for use as an accessory to a commercially known bait station, such as the prior art, commercially known bait station 10, as shown. Prior art bait stations have common features, commonly positioned, such as access ports for allowing rodents to enter and exit, components for hinged opening and closing, and secure access features, and differ primarily in their outer shape and interior features for holding the bait. Accordingly, while embodiments of the device of the disclosure for protecting a bait station from unwanted access are shown and described herein with reference to the prior art bait station 10 shown in FIGS. 1A-1C, one of skill in the art will appreciate that the scope of the device of the disclosure is not limited to use with the bait station 10 shown in FIGS. 1A-1C, and that the device of the present disclosure can be configured to fit to any commercial bait station.

The bait station 10 of FIGS. 1A-1C, like other commercial bait stations, houses poison for a targeted animal, in this case, rodents. For access to the poison by the targeted animal, the bait station 10 includes at least one access port 12 for the targeted animal to enter. Typically, a bait station has two access ports 12 which are located in opposing sides, usually in oppositely located front and rear sides, of the bait station, directly opposite one another, i.e., both located adjacent a same (left or right, e.g.) side. The bait station 10 would then be positioned alongside a wall with the side (left or right) adjacent the two access ports 12 also positioned along the wall. This is to encourage rodents, which typically travel in one direction along the sides of walls, to enter through the port 12 in a front side, i.e., a securable access side 14, for example, and exit (after accessing the bait, hopefully), and through the directly opposite port 12 in a rear side, i.e., a hinged side 16, of the bait station 10.

It should be noted that the "front side" of a conventional bait station is referred to herein as the "securable access side" 14 of the bait station, it being the side that an authorized user would open, in some cases using a key, to obtain access to the interior. Similarly, a so-called "rear side" opposite the securable access side 14 is referred to herein as the "hinged side" 16, it being the side which includes the hinges that allow the station 10 to be hingedly opened and closed.

As shown in the interior view of FIG. 1C, at least two posts 18 or similar elements are typically provided in commercial bait stations for fixing the poison thereto. In the prior art bait station 10 shown in FIGS. 1A-1C, the posts 18 extend upward from the interior surface of a bottom side 20 of the bait station 10. Interior walls 22 extending upward from the bottom side 20, as well as other features, may be included as an extra measure to keep the bait contained within the interior 24 of the bait station 10. In particular, interior walls 22 keep the bait removed from the access port(s) 12, so that nontargeted animals and the small hands of children cannot reach into the interior 24 and touch or remove the poisonous bait.

Also visible in the interior view of FIG. 1C is a thin-walled punch-out section 26 of the bottom side 20, which may be centrally located as shown. This thin-walled punch-out section 26 is configured to be punched-out to form a through-hole for inserting an anchoring stake up through the bottom side 20 of the bait station 10. For example, with the bait station hinged open, as shown in FIG. 1C, the anchoring stake may be inserted up through the punched-out hole left when the thin-walled punch-out section 26 is punched out. The anchoring stake (not shown) is typically about 2 feet long, and has an upper end in the form of a screw-head or a T wide enough to grip the inner surface of the bottom side 20 surrounding the punched-out hole, and a lower end that is typically flared for driving deep into the ground. The anchoring stake thus secures the bait station 10 at its intended location to prevent an animal from taking it away.

As best shown in FIGS. 1B and 1C, the bait station 10, like other conventional bait stations, typically includes one or more hinges 28 positioned along the hinged side 16 to allow opening and closing of the bait station 10. The particular bait station 10 shown has a single living hinge 28 that allows a top side 32, which forms, and is also referred to herein as a cover 32, of the bait station 10 to be rotatably opened to allow access to the interior 24 for rebaiting. Referring to FIGS. 1A and 1B, for example, the top side 32 of the bait station 10 may be closed after baiting or rebaiting, by hingedly rotating it around the hinge 28 and onto a bottom wall 33 of the bait station 10. A raised perimetral rib 40 extends along the perimeter of the cover 32 which is secure onto a rim 40' extending along the perimeter of the upper edge of the bottom wall 33. Both the rib 40 and rim 40' extend along the entire perimeter, including along a left 35 and right side 37 of the bait station 10, and around a front of a front shelf 42 and complementary front shelf 44 located at the front, i.e., the secure access side 14 of the bait station 10 of FIGS. 1A-1C. Other features are included to snap the cover 32 closed as securely as possible.

The front shelf 42 and complementary front shelf 44, which extends perpendicularly forward from the bottom wall 33, also provide a platform on the securable access side 14 for a locking device 30. Conventional bait stations typically include some type of locking mechanism to engage and lock closed the bait station, preventing unwanted opening and access by children and others. On the bait box 10 shown in FIGS. 1A-1C, the locking device 30 includes keyed insertion elements 34 located on an interior surface of the front shelf 44 constructed to forcibly be inserted and snapped into complementary receiving apertures 36 on the complementary front shelf 44 for locking.

Conventional bait stations are typically provided with a key for use by authorized persons to unlock the locked bait station. However, it is often possible to thwart such locking mechanisms by a suitable application of a force pulling the cover 32 and bottom wall 33 of the box 10 apart. As an extra security measure, therefore, referring to FIGS. 1A-1C, bait stations 10 may also include a set of aligned through-holes 38 on the front shelf 42, e.g., of the cover 32 and on the complementary shelf 44, e.g., for securing a screw therethrough. A screw of sufficient length may then be inserted through the front shelf 42 of the cover 32, e.g., and a nut and/or bolt secured onto the free end of the screw that protrudes through the complimentary front shelf 44 and tightened for additionally securing the bait station closed.

Even if through-holes 38 are not included on a commercial bait station, it is common practice to punch a hole through the top and bottom connecting front portions, e.g., through the front shelf 42 and complimentary front shelf 44, for inserting a screw therethrough and tightening and compressing the top and bottom of the bait station 10 together using a nut and/or bolt.

Despite the safeguards provided on conventional bait stations, there are still vulnerabilities that can be exploited, particularly by wild animals, to access and expose the dangerous poison bait inside. Once the bait station is compromised, the bait may be consumed and or dragged by the wild animal, or simply left in the compromised box, potentially poisoning a curious pet or child. Any of these scenarios clearly poses unacceptable potential harm to people and animals.

The protective covering device of the present disclosure provides additional protection against unwanted access to the dangerous poisonous bait enclosed in commercial bait stations. As will be clear from the figures and description of certain embodiments that follow, the protective covering device of the disclosure provides multiple means of protection against unwanted access. First, the material forming the protective covering device is preferably formed of a strong, tear-resistant material, that is difficult, if not impossible, for an animal to chew through. Second, as the inventors have demonstrated in recent tests of a protective covering device of the disclosure, constructed of a lower-cost tear-resistant laminated vinyl material, even when an animal chewed through portions of the protective covering device, including at the corners and along edges, the interior of the bait station 10 was not able to be accessed by the animals, because the bait station 10 could not be hinged open. This is because the enveloping construction of the protective covering device defines a tightly-fitted, substantially non-stretchable encircling band around the opposing left and right sides of the bait station 10, i.e., parallel to the hinged side 16 and securable access side 14, thus mechanically preventing hinged opening of the bait station 10 even if the locking device 30 is unlocked or removed. Accordingly, even when animals chewed through corners or sides of the device, they could not gain access to the device. They would have to chew along the entire lengths of the sides and across the front of the material, in embodiments, to release the band of material that prevents the hinged opening of the bait station 10.

Embodiments of a device in accordance with the present invention, as shown and described in reference to the figures, is configured for use with the commercial bait station 10 of FIGS. 1A-1C. It should be appreciated, however, that the invention is not limited to the particular embodiments described herein, which are intended to be exemplary only, and not limiting, and that numerous variations thereof are contemplated for use with any number of conventional bait stations, including those for rodents and/or other pests.

The present disclosure is also directed to a device for protecting a bait station from unwanted access, which is reusable and cost-effective.

Figure 2:
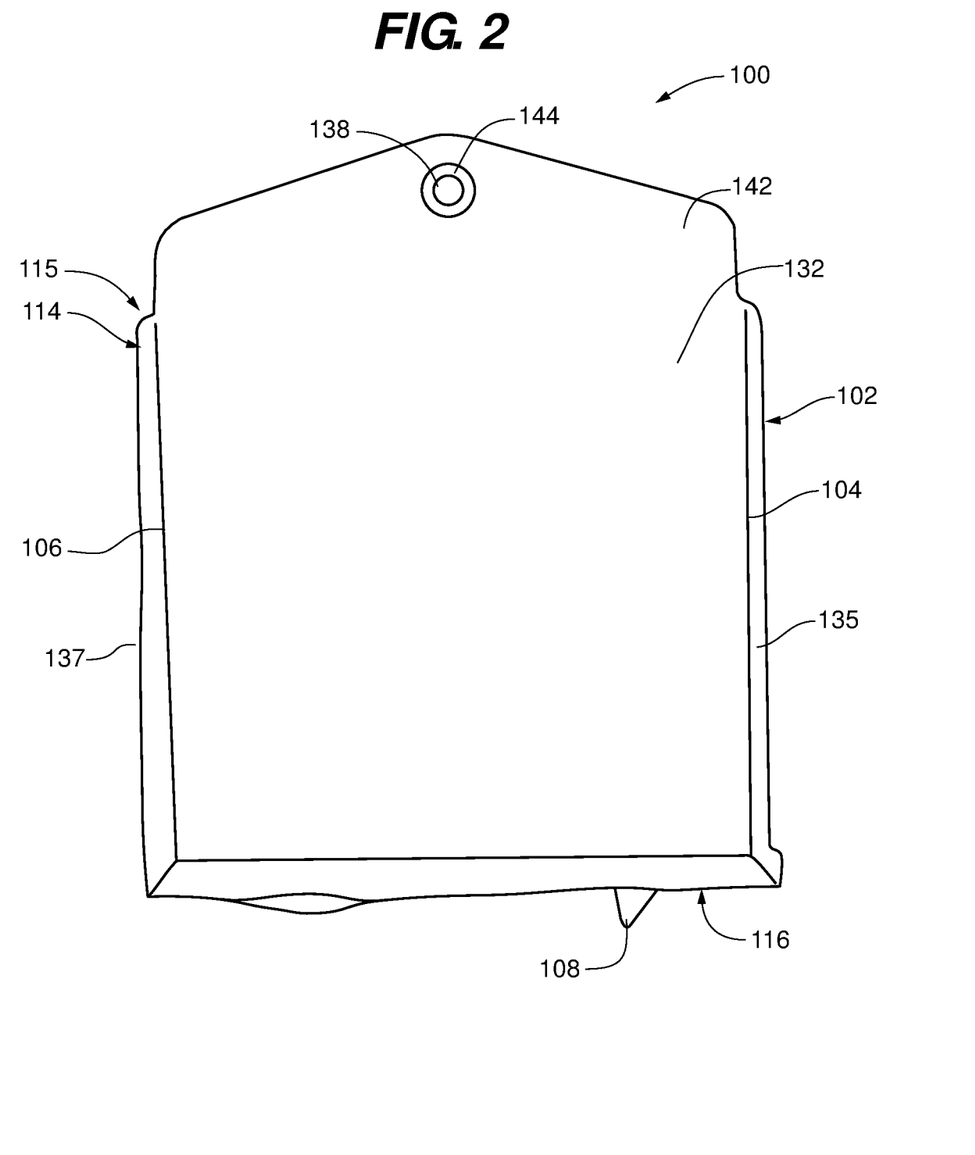
FIG. 2 is a pictorial representation of a top portion of an embodiment of a protective covering device of the present disclosure for protecting a rodent bait station from unwanted access.
Figure 7:
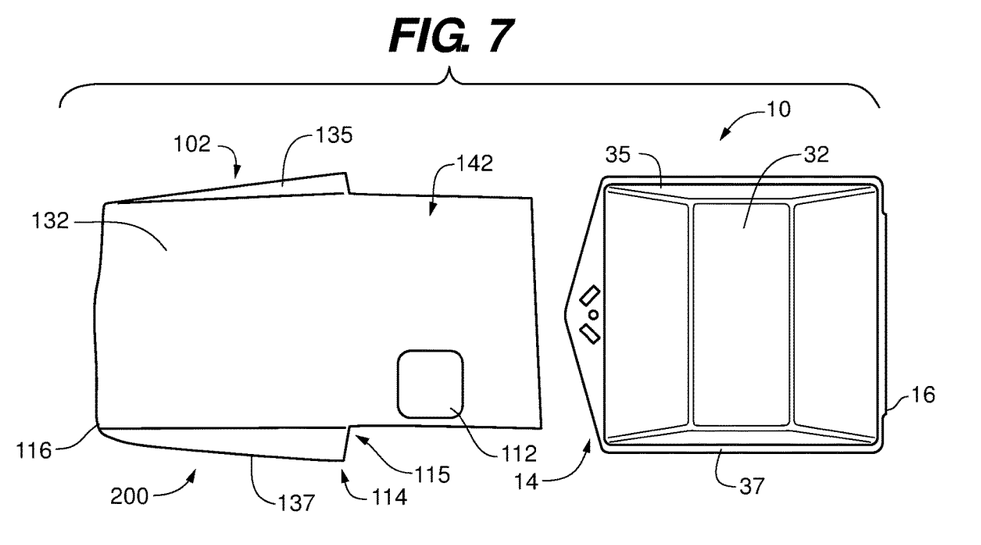
FIG. 7 is a top view of another embodiment of the protective covering device prior to inserting the commercial bait station of FIGS. 1A-1C therein.

Referring to FIGS. 2 and 7, with reference also to FIG. 1A, embodiments of the device include a sock-like body 102, also referred to herein as a "sock" 102, which is preferably formed of a tear-resistant material, and is sized and configured for snugly fitting over and encompassing a top side or cover 32, bottom side 20, the left 35 and the right side 37 of the bait station 10, and at least one of the secure access side 14 and the rear, hinged side 16.

In embodiments, the tear-resistant material is ballistic nylon. In embodiments, the tear-resistant material is a composite material including ballistic nylon.

In embodiments, the tear-resistant material is substantially non-stretchable.

In preferred embodiments, the tear-resistant material is formed of a ballistic nylon, and is reusable. The material may also be inexpensive and thus disposable.

In certain embodiments, the tear-resistant material is formed of nylon fibers of at least 1000 Denier.

In other embodiments, the tear-resistant material is a metallic mesh.

In embodiments, the tear-resistant material is a metallic mesh, in particular, a reusable solid metallic structure forming a cage over the bait station.

In some embodiments, the tear-resistant material is a laminated vinyl, which may, in embodiments, be a 13 oz, or in other embodiments, an 18 oz laminated vinyl.

Figure 3:
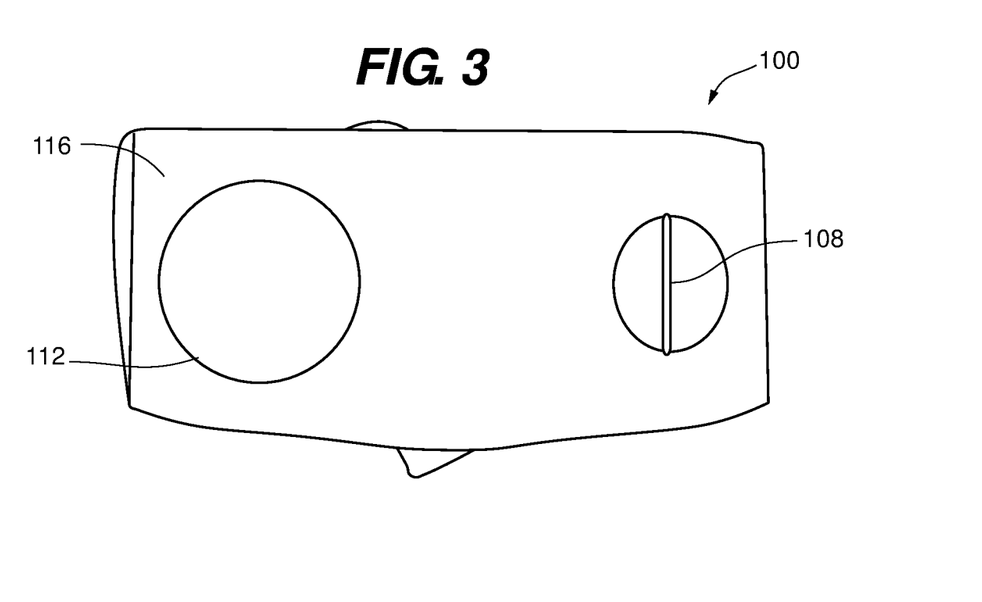
FIG. 3 is a pictorial representation of a rear portion of the embodiment of the device of FIG. 2.
Figure 8:
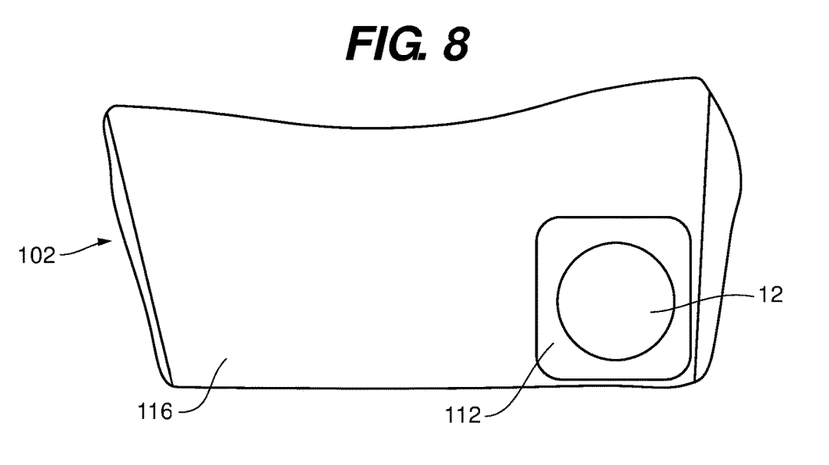
FIG. 8 is a pictorial representation of the device of FIG. 7 in use with the commercial bait station positioned therein, showing the closed end portion of the sock-like body over the secure access side of the bait station.

The sock-like body 102 is preferably configured to snugly fit onto and over the bait station 10 when in use, such that the sock-like body 102 forms a tight-fitting and form-fitting enclosure preferably encompassing the bottom side 20, top side or cover 32, the left 35 and the right side 37 of the bait station 10, and one of the secure access side 14 and the rear, hinged side 16. Referring also to FIGS. 3 and 8, the sock-like body 102 also includes at least one access opening 112, which may be a cut-out as shown, alignable with the access port(s) 12 of the bait station 10 when positioned for use to protect and cover the bait station 10.

Figure 9:
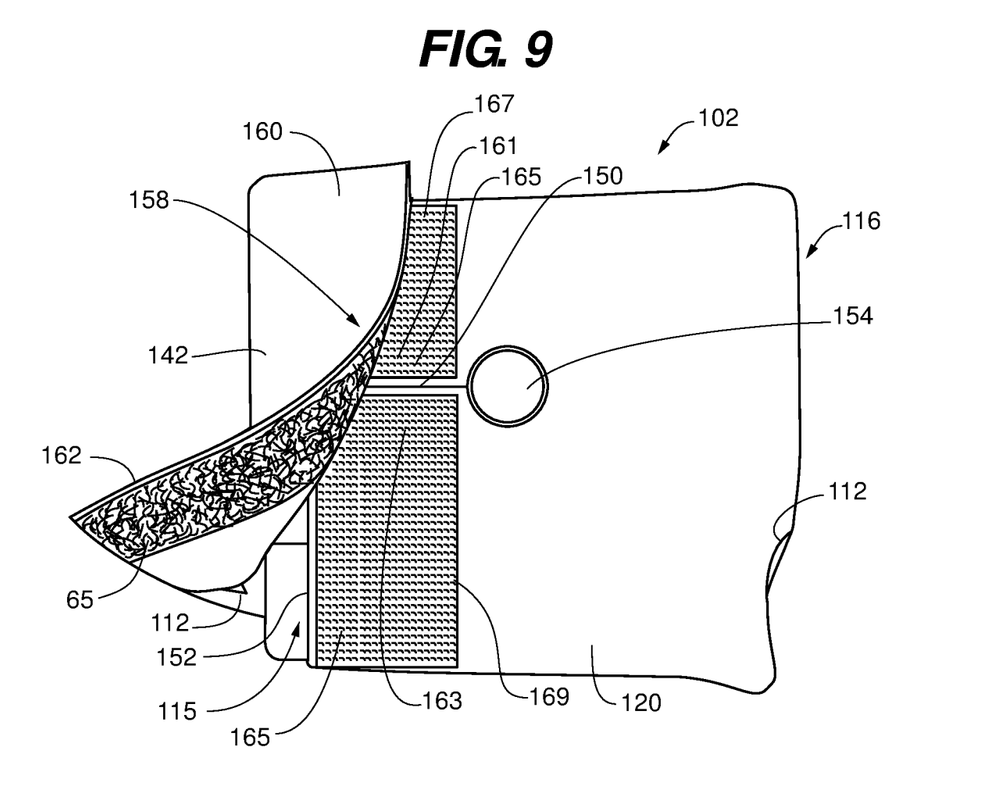
FIG. 9 is a bottom view of the device of FIG. 7 with the bait station enclosed therein, before completely securing the device in position.

As shown in FIGS. 2 and 4-6B, as well as FIGS. 7-9, the sock-like body 102 further includes an opening 115 at an open end portion 114 for inserting the bait station 10 therethrough, and a closed end portion 116 opposite the opening 115 to form the sock-like construction providing a tight-fitting enclosure encompassing the bait station 10.

Referring to FIGS. 2, 4-6B, as well as FIGS. 7-9, the protective covering device of the present disclosure also includes a securable flap 142 which extends from the sock-like body 102, beyond the opening 115, such that it at least partially overhangs the opening 115 of the sock-like body 102. In embodiments, the securable flap 142 extends from, and is preferably an integral portion of, either a top portion 132 or a bottom portion 120 of the sock-like body 102.

In preferred embodiments, the securable flap 142 is formed of the same tear-resistant material as the sock-like body 102.

The sock-like body 102 is preferably constructed to cover particularly vulnerable portions of a commercial bait box, preferably including the perimeters of the closing edges, e.g., the ribs 40 and rims 40', of the cover 32 and bottom wall 33 (see FIG. 1C). Accordingly, the sock-like body 102, in embodiments, may be constructed with appropriate openings alignable with the access ports 12, to be pulled on and over any of the sides of a conventional bait station, as long as at least the exposed left side 35, right side 37, and the cover 32 of a conventional bait station are substantially covered in use, that is, when the protective covering device is installed. As discussed supra, the sock-like body 102 is also preferably configured to form a tight-fitting, substantially non-stretchable, e.g., non-elastic, band encompassing the left side 35, right side 37, the bottom side 20, and the cover 32 to prevent hingedly opening the bait station 10.

In some embodiments of the device, for example, the device 100 of FIGS. 2-6B, the sock-like body 102 is configured to be pulled over the hinged side 16 of the bait station 10, so that the hinged side 16, including the hinges 28, of the bait station 10 is substantially covered and protected by the closed end portion 116 of the sock-like body 102.

In other embodiments, as shown for example with reference to the device 200 of FIGS. 7-9, the sock-like body 102 is configured to be pulled over the secure access side 14 of the bait station 10, and the securable flap 142 extending from the sock-like body 102 is constructed to substantially cover and protect the hinged side 16, including the hinges 28, of the bait station 10.

In embodiments, the sock-like body 102 may be constructed with as few seams as possible. In further embodiments, as best shown in FIGS. 2, 5A, and 5B, for example, at least one of a left side portion 135 and a right side portion 137 of the sock-like body 102 connecting the closed end portion 116 to the opening end portion 114 is seamlessly connected to at least one of the top portion 132 and the bottom portion 120 of the sock-like body 102.

Figure 5A:
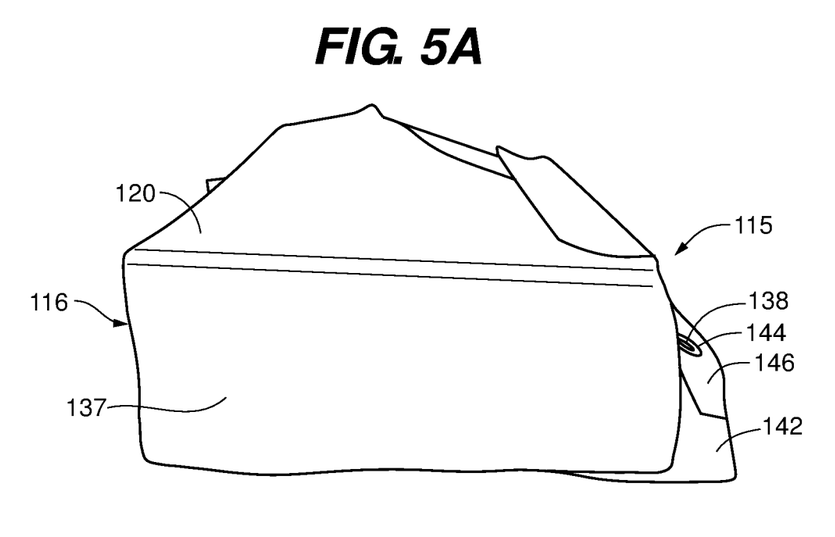
FIG. 5A is a pictorial representation of a side portion of the embodiment of the device of FIG. 2 with the top portion face down.
Figure 5B:
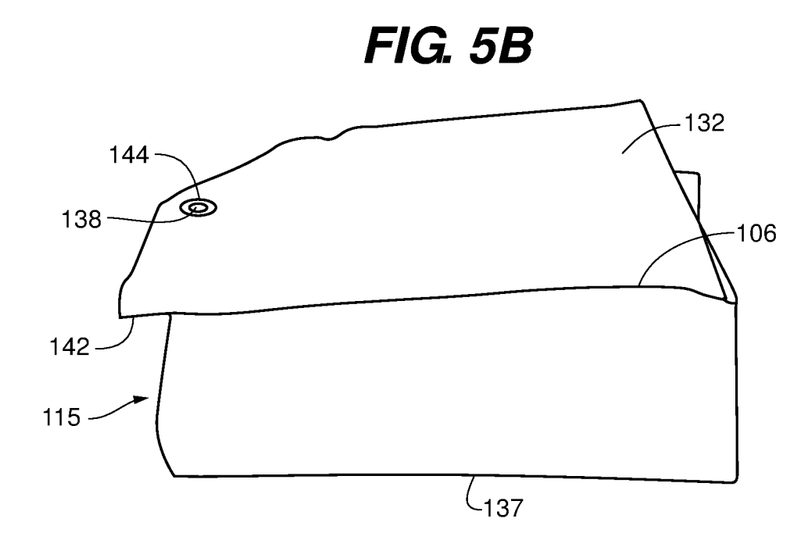
FIG. 5B is a pictorial representation of the side portion of the embodiment of the device of FIG. 2 with the top portion face up.

Still referring to FIGS. 2, 5A and 5B, in embodiments, the sock-like body 102 may have only two seams. For example, a first seam 104 may connect edges of the top portion 132 and the closed end portion 116 of the sock 102 to the left side portion 135 of the sock 102. A second seam 106 may connect edges of the top portion 132 and the closed end portion 116 of the sock 102 to the right side portion 137 of the sock 102. This leaves the entire length of each of the left side portion 135 and the right side portion 137 seamlessly connected along its opposite edge to the bottom portion 120 of the sock-like body 102, wherein the bottom portion 120 of the sock-like body 102 is alignable with the bottom side 20 of the bait station 10 in use.

In another embodiment, each of the two seams may alternatively connect edges of the bottom portion 120, rather than of the top portion 132, and the closed end portion 116 of the sock 102 to the right side portion 137 of the sock 102 and to the left side portion 135 of the sock 102. The entire length of each of the left side portion 135 and the right side portion 137 is seamlessly connected along its opposite edge to the top portion 132 of the sock 102.

Preferably, the sock-like body 102 has no exposed connecting edges or seams that run width-wise across the closed end portion 116.

Figure 6A:
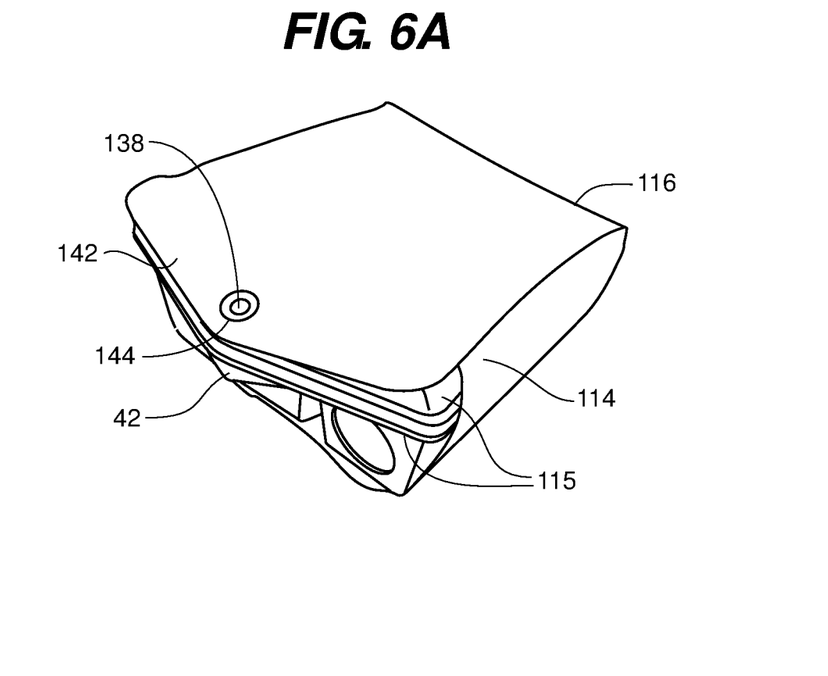
FIG. 6A is a perspective top-front pictorial representation of the embodiment of the device shown in FIGS. 2-5B fitted onto the prior art rodent bait station of FIGS. 1A-1C.
Figure 6B:
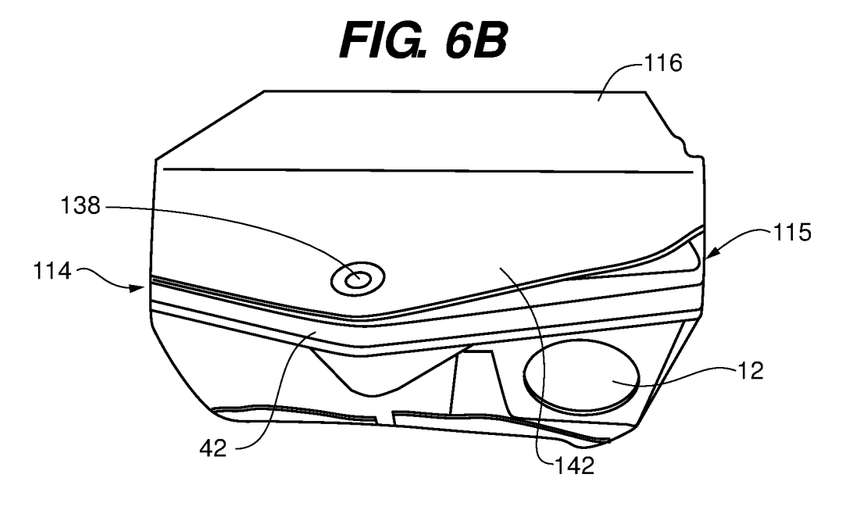
FIG. 6B is a perspective front pictorial representation of the embodiment of the device shown in FIGS. 2-5B fitted onto the prior art rodent bait station of FIGS. 1A-1C.

In embodiments, the closed end portion 116 the sock-like body 102 completely covers the hinge 28 of the bait station 10 (see FIG. 1B, 6B, for example). As shown in FIG. 3, the closed end portion 116 of the sock 102 may further include one of the access openings 112, in the form of a cut-out, configured to be alignable with the access port 12 on the bait station 10, without exposing the hinge 28 on the bait station 10 which is located above the access port 12. As shown in the embodiment 100, referring to FIG. 6B for example, a second access opening is provided by the opening 115, which is adjacent the securable flap 142, and is alignable with one of the access ports 12, the securable flap 142 only partially overhanging the opening 115 and resting on the front shelf 42 of the bait station 10, thus providing access to the access port 12.

In other embodiments, referring to FIGS. 7-9, the securable flap 142 completely covers the hinge 28 of the bait station 10. In this embodiment, the securable flap may include one of the access openings 112, which may be in the form of a cut-out, which is alignable with one of the access ports 12 in the bait station 10 in use. A second access opening 112 may be provided in the closed end portion 116 of the sock-like body 102 and is alignable with the other access port in the bait station 10.

It should be noted that while the access openings 112 in the embodiments are shown as either circular or square-shaped, any suitable shape and size may be used, as long as the access ports 12 of the bait station are not blocked.

As best shown in FIGS. 5A, 5B, and FIG. 2, with reference to FIGS. 1A, 1C, in embodiments, the sock-like body 102 additionally or alternatively has no exposed connecting edges or seams that run lengthwise along the left side portion 135 and/or right side portion 137 and that are coincident with the closing edges (40, 40', FIGS. 1A, 1C) of the bait station 10. Accordingly, in embodiments, the tight fight of the sock-like body 102 together with the careful placement of seams of the sock-like body 102 to avoid coincident alignment with hinges and opening edges of the bait station 10, advantageously provide added protection to the structures of an openable bait box that are most likely to be compromised.

As also shown in FIG. 3, the device 100 may also include a pull-tab 108, which facilitates removal of the tightly fitted sock 102 for accessing the bait station 10.

The securable flap 142 of the protective covering device of the disclosure secures the device, including the sock-like body 102, in position over the bait station 10 in use. In the embodiment 100, referring to FIGS. 2, 5A and 5B, and also to FIGS. 6A and 6B, for example, the device 100 is configured to be pulled over the rear, hinged side 16 of the bait station 10, such that the securable flap 142 adjacent the open end portion 114 of the sock-like body 102 extends, preferably integrally with the top portion 132, forward from the sock-like body 102, partially overhanging the opening 115, and onto the front shelf 42 of the bait station 10. The securable flap 142 in this embodiment 100 may be folded over and or onto any other similar portion of a front locking device of a conventional bait station.

In embodiments, the securable flap 142 extends over the locking device 30 to prevent unwanted access thereto.

In embodiments, the securable flap 142 includes one or more fastening element(s) for removably securing the device 100 in position on the bait station 100 in use.

In the embodiment 100 shown, the fastening element(s) include a grommet 144 surrounding a through-hole 138 through the securable flap 142. A reinforcing layer 146 is optionally included on the inside of the flap 142 (see FIG. 5A) into which the grommet 144 is inserted to reinforce the through-hole 138. Referring also to FIGS. 1A and 1C, the through-hole 138 is aligned with the set of aligned through-holes 38 on the front shelf 42 and the complementary shelf 44 of the bait box 10. Accordingly, the embodiment 100 of the device may be secured together with the bait station 10 by a screw inserted through the flap 142, cover 32 (via front shelf 42), and bottom portion (which includes shelf 44) of the box 10. A nut and/or bolt is then secured onto the free end of the screw that protrudes through the complimentary front shelf 44, for example, and tightened for additionally securing the device 100 onto the closed bait station 10. The installation and tightening of the screw both locks the bait station 10 closed and prevents the device 100 including the sock-like body 102 from being able to be pulled off the bait box 10.

Figure 4:
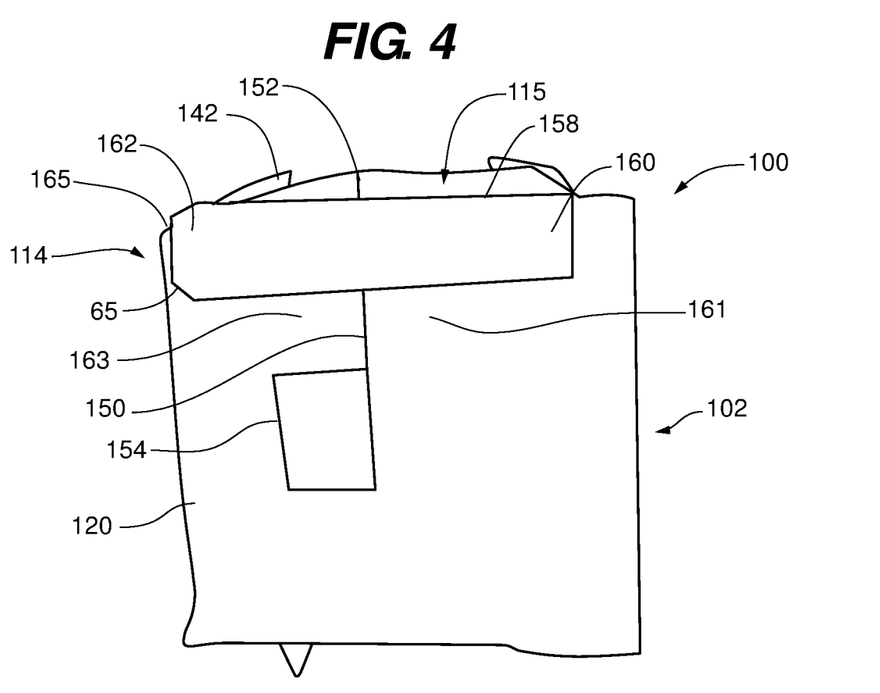
FIG. 4 is a pictorial representation of a bottom portion of the embodiment of the device of FIG. 2.

As described supra, conventional bait stations are typically anchored into the ground at a desired location using, for example, any conventional anchoring stake suitable for this purpose. Embodiments of the protective covering device of the present disclosure are configured to be installed over and onto, and removed from, a conventional bait box in situ, i.e., without having to uninstall the bait box from its stake or anchor which anchors it to the ground. For example, as best shown in FIGS. 4 and 9, with reference to FIG. 1C, for example, the bottom portion 120 of the sock-like body 102 of the device preferably includes an access slit 150 that extends from a front edge 152 of the bottom portion 120 of the sock-like body 102, i.e., from the opening 115, to a cut-out 154 positioned to align with the punch-out section 26 for insertion of the anchoring stake therethrough. Accordingly, the sock-like body 102 can be slid onto and/or off of the bait station 10 even with an anchoring stake holding the bait station 10 in place on the ground.

In some embodiments 100, referring for example to FIGS. 6A and 6B, the securable flap 142 may extend over the locking device 30 (see FIG. 1A), but not down over the securable access side 14 and fixed to the bottom of the bait box 10. It will be appreciated that the securable flap 142 is well-anchored in these embodiments via the screw mounted through the through-holes 138, 38 of the sock-like body 102. In these embodiments 100, and in the embodiments 200 represented by FIGS. 7-9, the anchoring of the bottom portion 120 of the sock-like body 102 via the anchoring stake, as further described below, also prohibit removal of the device 100 from an anchored bait box 10 in use.

In embodiments, the protective covering device also includes a closing element 158 for closing the gap formed by the access slit 150 in use. Referring to FIG. 4, the closing element 158 may be in the form of a fastening strip extending across the access slit 150 having a first end portion 160 attached, and in embodiments, anchored to the bottom portion 120 on a first side 161 of the access slit 150. A second end portion 162, which may be a free end, opposite the (anchored) first end portion 160, includes one or more fastening elements 65 positioned and configured to removably attach to one or more complementary fastening elements 165 positioned along a second side 163 of the access slit 150 on the bottom portion 120, as shown in FIG. 4, as well as in FIG. 9.

The fastening element(s) 65 and complementary fastening element(s) 165 may be formed of VELCRO® strips. Once the sock-like body 102 is installed with the anchoring stake positioned through both the sock-like body 102 and the bait station 10, the access slit 150 may be held closed, and prevented from opening at the front edge 152, by securing the closing element 158 to the bottom portion 120 of the sock-like body 102 across both sides of the access slit 150.

In regard to further embodiments 200 of the device, as best shown in FIG. 9, the closing element 158 may be provided, in embodiments, by the securable flap 142, wherein the first end portion 160 as well as the second end portion 162 form the securable flap 142 and are removably attached to the bottom portion 120 along each of the first side 161 and the second side 163 of the access slit 150, respectively, via fastening element(s) 65 on the securable flap 142 and complementary fastening element(s) 165 on the bottom portion 120 of the sock-like body 102.

Referring to FIGS. 7-9, in embodiments, the securable flap 142 of a protective covering device 200 of the disclosure may extend over and cover the opening 115 of the sock-like body 102.

In embodiments, the securable flap 142 is extendable over the opening 115 and onto one of the top portion 132 and the bottom portion 120 of the sock-like body 102. The securable flap 142, as shown in FIG. 9, may further include one or more fastening elements 65 and the one of the top portion 132 and the bottom portion 120 may include one or more complementary fastening elements 165 for removably securing the securable flap over the opening 115 and onto the sock-like body 102, the device thereby substantially encompassing the bait station on all sides.

In the particular embodiment shown in FIGS. 7-9, the securable flap 142 is extendable from the top portion 132 over the opening and onto the bottom portion 120 of the sock-like body 102, the securable flap 142 being removably attachable to the bottom portion 120 of the sock-like body 102, wherein the complementary fastening element 165 is positioned on the bottom portion 120 on both sides of the access slit 150. The complementary fastening element 165 has a first portion 167 positioned adjacent the first side 161 of the access slit 150 and a second portion 169 on the bottom portion 120 adjacent the second side 163 of the access slit 150. As shown, the closing element 158 in this embodiment include fastening elements 65 along both the first side 161 and the second side 163 of the access slit 150, the closing element 158 covering at least a portion of the access slit 150 and removably attaching the securable flap 142 to the sock-like body 102 via complementary fastening elements 165 positioned on both the first side 161 and the second side 163 of the access slit 150.

While particular embodiments of the present disclosure have been particularly shown and described with reference to specific embodiments, it should be apparent to those skilled in the art that the foregoing is illustrative only and not limiting, having been presented by way of example only. It is to be understood that the disclosed embodiments are merely examples of the disclosure, which may be embodied in various forms and detail without departing from the spirit and scope of the disclosure. Therefore, specific structural and functional details disclosed herein are not to be interpreted as limiting. Numerous other embodiments may fall within the scope of the accompanying claims and equivalents thereto.

What is claimed is:

1. A device for protecting a bait station from unwanted access, the bait station including at least one access port for a target animal to pass therethrough, a hinged side and a securable access side opposite the hinged side to provide authorized access to interior contents of the bait station, and a bottom side for anchoring the bait station to a surface in use, the device comprising:
    a body including an opening for inserting the bait station therethrough and a closed portion opposite the opening, the body configured to form an enclosure encompassing and fitting over and onto the bait station, the body further including at least one access opening alignable with the at least one access port of the bait station in use; and
    a securable flap extending from the body beyond, and at least partially overhanging, the opening of the body, the securable flap securing the device in position on the bait station in use.

2. The device of claim 1, wherein one of the at least one access opening is provided adjacent the securable flap, wherein the securable flap only partially overhangs the opening.

3. The device of claim 1, wherein the at least one access opening is two access openings positioned opposite one another, a first one of the two access openings being positioned in the securable flap and a second one of the two access openings being positioned in the closed portion of the body.

4. The device of claim 1, wherein the body is formed of a tear-resistant material.

5. The device of claim 4, wherein the tear-resistant material is substantially non-stretchable.

6. The device of claim 4, wherein the tear-resistant material is a ballistic nylon.

7. The device of claim 1, wherein at least one of a left side portion and a right side portion of the body connecting the closed portion to the opening is seamlessly connected to one of a top portion and a bottom portion of the body.

8. The device of claim 1, wherein the body further includes a bottom portion alignable with the bottom side of the bait station in use, the bottom portion including an access slit and a cut-out for insertion of an anchoring stake therethrough, the access slit extending from the opening of the body to the cut-out.

9. The device of claim 8, further including: a fastening strip having a first end portion anchored to the bottom portion of the body adjacent a first side of the access slit, and a second end portion that extends across the access slit and includes a fastening element; and a complementary fastening element positioned on the bottom portion adjacent a second side of the access slit, the fastening element being removably attachable to the complementary fastening element for holding closed the access slit.

10. The device of claim 8, wherein the securable flap is extendable over the opening, from one of and onto an other one of a top portion and the bottom portion of the body, the securable flap including a fastening element and the other one of the top portion and the bottom portion including a complementary fastening element for removably securing the securable flap over the opening and onto the body, the device thereby substantially encompassing the bait station on all sides.

11. The device of claim 10, the securable flap extendable from the top portion over the opening and onto the bottom portion of the body, wherein the complementary fastening element is positioned on the bottom portion, the complementary fastening element having a first portion adjacent a first side of the access slit and a second portion adjacent a second side of the access slit, wherein a length of the fastening element extends across both the first side and the second side of the access slit, the fastening element covering at least a portion of the access slit and removably attaching the securable flap to the body via both the first portion and the second portion of the complementary fastening element.

12. The device of claim 10, wherein the fastening element and the complementary fastening element are hook-and-loop elements.

13. The device of claim 1, wherein the securable flap only partially overhangs the opening and includes a through-hole surrounded by a grommet for facilitating securing the securable flap directly to the bait station.

14. The device of claim 4, wherein the tear-resistant material is a laminated vinyl.

15. The device of claim 4, wherein the tear-resistant material is comprised of one of nylon fibers of at least 1000 Denier and a metallic mesh.

16. A device for protecting a bait station from unwanted access, the bait station including at least one access port for a target animal to pass therethrough, a hinged side and a securable access side opposite the hinged side to provide authorized access to interior contents of the bait station, and a bottom side for anchoring the bait station to a surface in use, the device comprising:
    a body formed of a tear-resistant material, the body including an opening for inserting the bait station therethrough and a closed portion opposite the opening, the body configured to form an enclosure encompassing and fitting over and onto the bait station, the body further including at least one access opening alignable with the at least one access port of the bait station in use; and a securable flap extending from the body, the securable flap being extendable over the opening and onto one of a top portion and a bottom portion of the body, the securable flap including a fastening element, and the one of the top portion and the bottom portion including a complementary fastening element for removably securing the securable flap over the opening and onto the body.

17. The device of claim 16, wherein a bottom portion of the body further includes an access slit extending from the opening of the body to a cut-out configured for insertion of an anchoring stake therethrough.

18. In combination, a bait station including at least one access port for a target animal to pass therethrough, a hinged side and a securable access side opposite the hinged side to provide authorized access to interior contents of the bait station, and a bottom side for anchoring the bait station to a surface in use, the bottom side including a punch-out for insertion of an anchoring stake therethrough; and a device for protecting the bait station from unwanted access and installable on the bait station in situ anchored to a surface, the device including:

a body formed of a tear-resistant material, the body including an opening for inserting and encompassing the bait station therein, a closed portion opposite the opening, the body further including at least one access opening aligned with the at least one access port of the bait station, and a bottom portion alignable with the bottom side of the bait station in use, wherein the bottom portion includes an access slit extending from the opening of the body to a cut-out for insertion of the anchoring stake therethrough.

19. The combination of claim 18, the device further including a securable flap extending from the body, the securable flap extending over the opening and onto the bottom portion of the body, the securable flap including a fastening element, and the bottom portion including a complementary fastening element for removably securing the securable flap over the opening and onto the bottom portion of the body.

20. The combination of claim 19, wherein the body and the securable flap are formed of a ballistic nylon material.

* * * * *